US008538782B2

(12) United States Patent
Olivier et al.

(10) Patent No.: US 8,538,782 B2
(45) Date of Patent: Sep. 17, 2013

(54) METHOD AND SYSTEM FOR DATA SUBMISSION MANAGEMENT OF INSURANCE APPLICATION IN A DATA PROCESSING SYSTEM

(75) Inventors: Lyle Eric Olivier, Brandon, FL (US); Lucas Martinez, Kissimmee, FL (US); David L. Perish, Cleveland, OH (US)

(73) Assignee: Morstan General Agency, Inc., Manhasset, NY (US)

( * ) Notice: Subject to any disclaimer, the term of this patent is extended or adjusted under 35 U.S.C. 154(b) by 710 days.

(21) Appl. No.: 12/537,838

(22) Filed: Aug. 7, 2009

(65) Prior Publication Data

US 2010/0036686 A1 Feb. 11, 2010

Related U.S. Application Data

(63) Continuation-in-part of application No. 11/225,266, filed on Sep. 12, 2005.

(60) Provisional application No. 60/609,201, filed on Sep. 10, 2004.

(51) Int. Cl.
*G06Q 40/00* (2012.01)
(52) U.S. Cl.
USPC .............................................. 705/4
(58) Field of Classification Search
USPC ...................................... 705/4, 35
See application file for complete search history.

(56) References Cited

U.S. PATENT DOCUMENTS

| | | | | |
|---|---|---|---|---|
| 7,333,939 B1 * | 2/2008 | Stender et al. | | 705/4 |
| 7,343,310 B1 * | 3/2008 | Stender | | 705/4 |
| 7,593,889 B2 * | 9/2009 | Raines et al. | | 705/38 |
| 7,627,490 B2 * | 12/2009 | Glick et al. | | 705/4 |
| 8,041,617 B1 * | 10/2011 | Stender | | 705/35 |
| 2001/0049611 A1 | 12/2001 | Peach | | |
| 2002/0120474 A1 * | 8/2002 | Hele et al. | | 705/4 |
| 2002/0120476 A1 | 8/2002 | Labelle et al. | | |
| 2002/0138310 A1 | 9/2002 | Sagalow | | |
| 2002/0194033 A1 | 12/2002 | Huff | | |
| 2004/0030649 A1 * | 2/2004 | Nelson et al. | | 705/44 |
| 2004/0078243 A1 | 4/2004 | Fisher | | |
| 2005/0187881 A1 * | 8/2005 | McGiffin et al. | | 705/64 |

OTHER PUBLICATIONS

Bort, J., & Editor, C. "Insurance agents spiral toward future—slow to adopt technology, the insurance market remains in dire need of VAR services". VARbusiness, 14(13), (Jun. 22, 1998): p. 105.*

(Continued)

*Primary Examiner* — Hani M Kazimi
(74) *Attorney, Agent, or Firm* — Andrew F. Young, Esq.; Lackenbach Siegel, LLP

(57) ABSTRACT

The present invention is a method and system for data submission management of insurance application data by a host data processing system. The invention comprises authenticating the submission of data relative to an insurance applicant. The authenticated data is matched with a set of data points and merged to create a submission to be matched with a set of price points in a quotation routine to establish a quote. The quote is then accepted or rejected by the applicant. If accepted, then the applicant is bound conditionally. A policy is then issued to the applicant in respect of the quote. Subsequently, a set of endorsements may be added to the policy. A policy information routine for matching the insurance application data to a set of data fields is initiated to establish a living folder which can be the source of data for populating other routines, system folders, or report generators.

44 Claims, 12 Drawing Sheets

(56) References Cited

OTHER PUBLICATIONS

Wheeler, R. Systems scene. "Insurance Brokers' Monthly and Insurance Adviser", 46(6), (Jun. 1996):10-10.*

Insurance Noodle, Inc., "Licensing Technology: Overview", www.insurancenoodle.com, 2000-2003.

Insurance Noodle, Inc., "Licensing Technology: NoodleInterface", www.insurancenoodle.com, 2000-2003.

Insurance Noodle, Inc., "Licensing Technology: NoodleWeb", www.insurancenoodle.com, 2000-2003.

Insurance Noodle, Inc., "Licensing Technology: NoodleEnginee", www.insurancenoodle.com, 2000-2003.

* cited by examiner

METHOD AND SYSTEM FOR DATA SUBMISSION MANAGEMENT OF INSURANCE APPLICATION IN A DATA PROCESSING SYSTEM

CROSS REFERENCE TO RELATED APPLICATIONS

This application is a continuation-in-part from U.S. Ser. No. 11/225,266 filed Sep. 12, 2005, which in turn claims priority from US Prov. App. No. 60/609,201, filed Sep. 10, 2004, the entire contents of each of which are incorporated herein by reference.

BACKGROUND OF THE INVENTION

1. Field of the Invention

The present invention relates to a method and system for managing applications data submission, policy quotation, and policy issuance for insurance applications.

More specifically, the present invention relates to a method and system providing a real-time, entry, collection and processing of insurance application data. The processing of the data includes the generation of a policy quote together with the means for issuing a subsequent policy. The data management is furthered through the creation of a living folder which can accept or donate data from/to each of the routines, rating engines and report generators under control of the system.

2. Description of the Related Art

The related art involves a plurality of related processes and systems for selected aspects of the insurance business. Selected examples of such related processes and systems fail to include the novel aspects discussed herein, but are supplied below and incorporated fully herein to aid the reader in grasping the overall concepts discussed.

In a first example, US Pub. No. 2001/0049611 to Peach (hereinafter referred to as "Peach"), the contents of which are fully incorporated herein by reference, provides a system and method for electronically acquiring and distributing insurance policy data to broker offices. As noted in Peach, while selected client data is entered into insurance industry standardized forms, such as those provided by the Association for Cooperative Operations Research (ACORD), such data entry is well known as responding to data inquiry requests, and fails to disclose the unique data-stamp validation and tracking elements discussed herein.

In an additional example of a related art reference, US Pub. No. 2002/0138310 to Sagalow (hereinafter referred to as "Sagalow"), the contents of which are fully incorporated herein by reference, the inventor provides a process for online sale of internet insurance products in a very brief three-page discussion, but fails to focus on the present invention and instead is customer-focused, allowing a customer to select an insurance desired and to apply for the same. Unfortunately, Sagalow fails to recognize the needs within the insurance management and intermediate underwriting, binding, and tracking management areas.

In an additional example, US Pub. No. 2004/0078243 to Fisher (hereinafter referred to as "Fisher"), the contents of which are fully incorporated herein by reference, the inventor discusses an automatic insurance processing method wherein an end-insured completes an insurance request form and emails the same for later review and underwriting and return after underwriting. Unfortunately, Fisher fails to address the industry specific needs noted below for an efficient and effective management of a secure underwriting insurance system.

In another additional example, as noted in US Pub. No. 2002/0120476 to Labelle et al. (hereinafter referred to as "Labelle"), the contents of which are fully incorporated herein by reference, the inventors discuss a system and method of dispensing insurance through a computer network. While Labelle does provide electronic distribution of insurance products, it fails in completing the essential security and management aspects provided herein.

In a further related example, as noted in US Pub. No. 2002/0194033 to Huff, the contents of which are fully incorporated herein by reference, the inventor discusses an automatic insurance data extraction and quote generating system, and methods therefore.

In a final related example, provided by "Insurance Noodle", and noted at http://www.insurancenoodle.com/Products/licensing/index.asp, the contents of which are fully incorporated herein by reference, the inventors provide various data entry, and risk appetite programs for license and also discuss the cross-incorporation of insurance billing and insurance services.

What is not appreciated by the related art, is the need for an insurance management system providing the improvements enabled by the present disclosure.

Accordingly, based upon the limited related art and its inability to provide a comprehensive electronic insurance application receipt, tracking, underwriting, binding, and issuing system, there is a need for an improved method and system for insurance applications, underwriting, and management thereof, having at least one of the following benefits:
(a) a stream-lined system minimizing human administration costs throughout the insurance request, broker, underwriting, binding, and issuance process;
(b) minimize the loss of "unusual" applications and those applications otherwise lost or trapped within an application tracking system or requiring additional information or input;
(c) to minimize the generation of duplicate of ghost applications or preliminary quotations and underwritings within an overall insurance issuance and managing system; and
(d) allow the generation, tracking, and management of "electronic notes" on each underwriting and application page that are created detailing the date and time each task was completed, who performed the task and what was performed, as well as any additional follow-up matters.

Additionally, there is the need for the provision of a living folder for the acceptance and donation of data relative to one or more applicants and/or insureds and the applications and/or policies related to them.

OBJECTS AND SUMMARY OF THE INVENTION

An aspect of the present invention is to provide an enabling system providing at least one of the benefits noted above.

Another aspect of the present invention is to provide a living folder for the acceptance and donation of data relative to one or more applicants and/or insureds and the applications and/or policies related to them.

The present invention relates to a method and system for data submission management of insurance application data by a host data processing system. The invention comprises authenticating the submission of data relative to an insurance applicant. The authenticated data is matched with a set of data points and merged to create a submission to be matched with a set of price points in a quotation routine to establish a quote. The quote is ultimately accepted or rejected by the applicant outside of the system parameters. If accepted, then the underwriter will issue an order to bind conditionally. A policy is then issued to the applicant in respect of the quote. Subsequently, a set of endorsements may be added to the policy. A policy information routine for matching the insurance application data to a set of data fields is initiated to establish a living folder which can be the source of data for populating other routines, system folders, or report generators.

According to an embodiment of the present invention there is provided a method and system for data submission management of insurance application data by a data processing system. The method comprises a number of steps which include authenticating, at a remote node, the submission of data to be entered in the system relative to an insurance applicant. The authenticated data is then matched with a set of one more pre-established routines residing in a system memory and corresponding to particular data entry points indicative of the routines to be utilized.

The authenticated data is merged with the matched routines to create a submission; each submission further comprising a set of data fields.

The submission is then submitted to a host data processing center to match the data fields with a set of price points in a quotation routine to establish a quote in respect of the submission.

The quote is then transmitted from the host data processing center to the remote node where it is accepted or rejected by the applicant. If the quote is rejected, then the system user is prompted as whether or not to modify the data to be authenticated; and, if the data is not modified, than terminating the routine. If, however, the quote is accepted, then the applicant is bound conditionally and one or more tasks to be performed in respect of the binding are identified. A policy is then issued to the applicant in respect of the quote. Subsequently, the one or more tasks, such as a facility inspection, repair, or an individual's physical exam, are performed, and a set of one or more endorsements (changes or modifications) to the policy in respect of a result related to the tasks is added to the policy.

The pre-established routines further comprise the steps of determining a set of one or more options that are available to the applicant for construction of the policy. A set of administrative options, based on the data input, are also made available by the system. Additionally, the pre-established routines further comprise the step of determining the set of one or more tasks to be performed subsequent to the policy being issued. The system can generate a report, relative to a policy, and derived from the data collected by the system.

The data input is utilized by the host data processing center to re-calculate and re-set one or more data fields, such as price points, resident within the system memory. The pre-established routines are trainable by updating one or more fields with data that is input periodically to reflect market conditions and fluctuations.

The method further comprises the acceptance of an application for entry into the data processing system. A policy information routine for matching the insurance application data to a set of one or more data fields relevant to the application is initiated to establish a living folder. The living folder can be modified at any time required by the system; and, can be the source of data for populating other routines, system folders or report generators. The living folder further comprises a plurality of sub-folders for storing data relevant to an applicant's application or policy. Each of the sub-folders can be populated with data generated by the plurality of routines and collected from the data processing system. Additionally, the data processing system can query each of the sub-folders and withdraw data from the relevant sub-folder based upon a set of pre-established criteria and needs.

The authenticated data is then merged with the matched routines to create a quick quote; the quick quote further comprising a set of data fields. The quick quote is then transmitted from the host data processing center to the remote node, where it is accepted or rejected by the applicant. A quick quote differs from the standard quote in that it is using a reduced number of fields to draw data as compared to a full policy quote. The advantage to the applicant is in terms of speed because of the reduced amount of information required of the applicant.

The system of the present invention, on the other hand, comprises the host data processing center and the set of one or more remote nodes for linking with the host data processing center. At least one of the remote nodes can be co-located with the host. The system includes transmission means for transmitting data between each one of the set of one or more remote nodes and the host data processing center. The transmission means can comprise wireless and/or hard-wired transmission means depending upon the nature of the network utilized. Further, the system can reside in either a wide area network (WAN), a local area network (LAN), or be accessible through the Internet.

Additionally, there is an insurance policy creation application residing in the data processing system, the application further comprising an input routine residing in the host data processing system wherein the routine accepts data input from at least one of the remote nodes relative to an insurance application. The input routine can be resident at the host data processing center, or at the remote node.

The system further comprises authentication means for authenticating the data input. The data is then introduced to first matching means for matching the authenticated data with a set of one more pre-established routines residing in a memory of the host data processing center and corresponding to particular data entry points. Merging means then merge the authenticated data with the matched routines to create a submission comprising a set of data fields. Then, second matching means match the set of data fields with a set of price points in a quotation routine of the host data processing center to establish a quote in respect of the match. Matching means then allow the quote to be selected or rejected by the applicant. If the quote is rejected, then it is determined through query whether or not to modify the data to be authenticated; and, if the data is not modified than terminating the routine. However, if the quote is accepted, then the system user creates a binder and one or more tasks to be performed in respect of the binding are identified. The system can then generate a policy to be issued to the applicant in respect of said quote.

In addition to the routines and hardware previously mentioned, the system further comprises a forms library for providing a pre-determined format for data to be transmitted in the form of the quote, the policy, or any number of reporting formats. There is also provided a rating engine for calculating the set of price points for the quotation routine and printing means for printing a set of reports and/or documents derived from the system.

An important aspect of the present invention is the creation of a living folder that can accept or donate data relative to each insurance holder's policy or application. The data processing system further comprises a data management routine for directing data to each of the sub-folders in accordance with a pre-established set of criteria associated with each of the sub-folders.

The living folder further comprises a set of one or more sub-folders. In a preferred embodiment of the present invention, there are a plurality of sub-folders which include a first sub-folder for storing general information about one or more policies associated with the applicant. Additionally, there may be: a second sub-folder for storing insurance broker information; a third sub-folder for storing details of said one or more policies; a fourth sub-folder for storing endorsements associated with said one or more policies; a fifth sub-folder for storing one or more documents associated with said one or more policies; a sixth sub-folder for storing communications in respect of said one or more policies; a seventh sub-folder for storing notes relative to said one or more policies; and an eighth folder for storing task requests relative to said one or more policies.

The data processing system further comprises a routine for creating notes for entry into a sub-folder (the seventh sub-folder of the exemplar preferred embodiment) of the living folder. The routine further comprises a set of rules for automatically creating notes based on available content; a set of rules for automatically creating notes at specific pre-established date/time points; and, a set of rules for creating notes based upon certain events.

Each of the sub-folders may be further sub-divided in accordance with the needs of the respective sub-folder. For instance, in a preferred embodiment of the present invention, the first sub-folder further comprises: first data identifying a system user; second data identifying a broker/underwriter; and, third data identifying the status of said policy. The second sub-folder further comprises: a broker name and identifying data; a broker address; and, a set of one or more contact points relative to said broker.

Additionally, in a preferred embodiment, the third sub-folder further comprises: a set of policy coverages; a set of policy limits; a set of policy costs; a set of bottom line costs associated with said policy; and, a set of locations covered by said policy. The third sub-folder can additionally comprise a set of insured classes or additional coverages associated with the one or more policies.

Additionally, in a preferred embodiment, the fourth sub-folder further comprises data identifying endorsements pertaining to said policy; and, the fifth sub-folder further comprises documents generated in the course of managing the policy.

Additionally, in a preferred embodiment, the sixth sub-folder further comprises: a set of electronic copies of communications relative to a policy; and, data descriptive of each communication of the set of electronic communications.

Additionally, in a preferred embodiment, the seventh sub-folder further comprises a set of notes pertaining to one or more events associated with the relevant policy; and, the eighth sub-folder further comprises a description of each of a set of tasks to be performed relative to the policy.

In furtherance of the creation of the living folder, the method of the present invention further includes initiating a sweeping routine having pre-set parameters for querying the set of one or more remote nodes, said remote nodes comprising data; identifying data relevant to the pre-set parameters at each one of the queried nodes; and, transmitting a copy of the relevant data to the system for use by the application in populating the living folder.

The above, and other objects, features and advantages of the present invention, will become apparent from the following description read in conjunction with the accompanying drawings, in which like reference numerals designate the same elements.

DETAILED DESCRIPTION OF THE PREFERRED EMBODIMENTS

Figure 1:
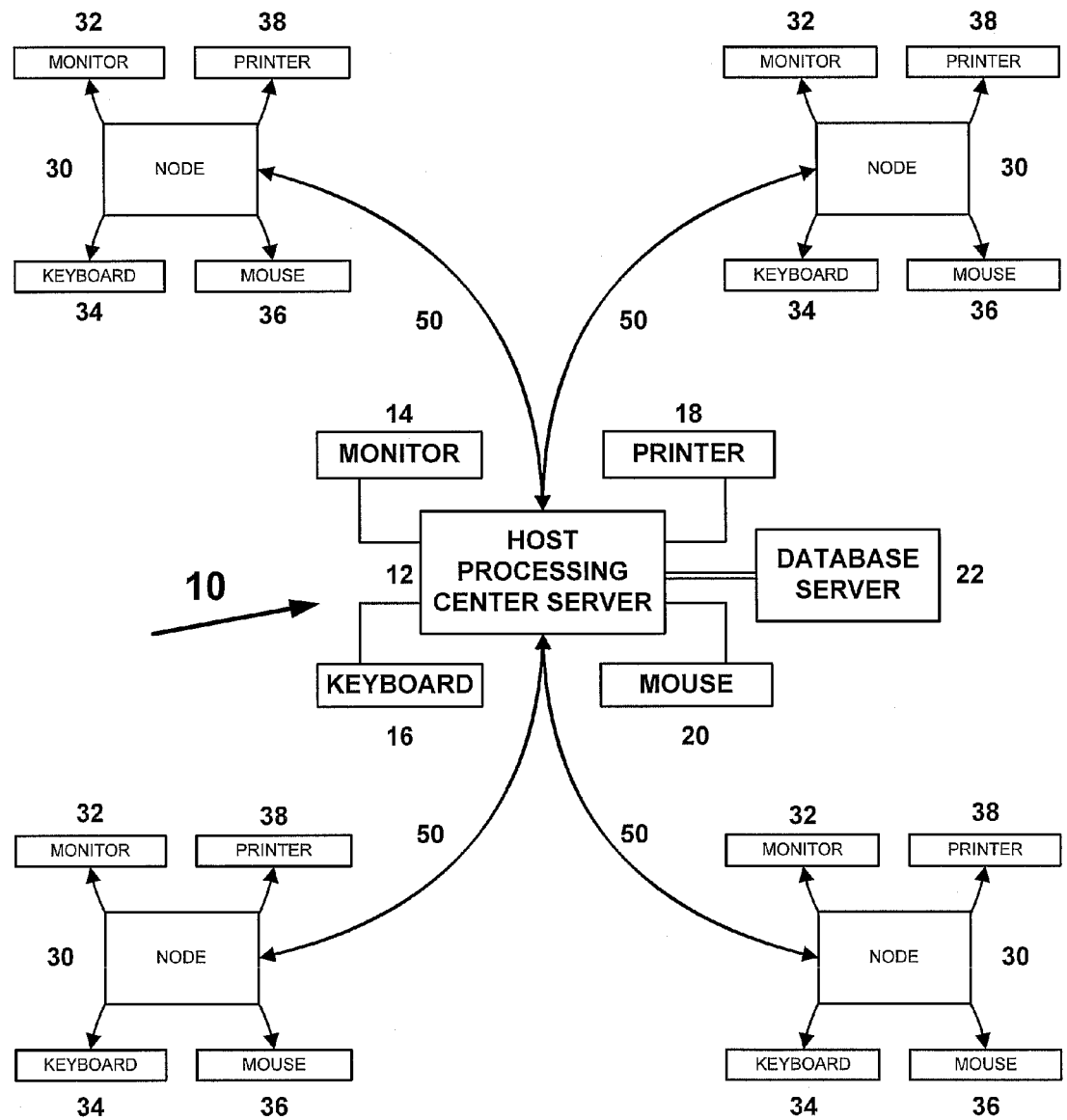
FIG. 1 is an upper level diagram of the system of the present invention showing the host data processing center and exemplary nodes.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 is an upper level diagram of the system of the present invention showing the host data processing center 10 and exemplary nodes.

The host data processing center 10 has a central processing unit 12 interoperatively linked to: a monitor 14; a keyboard 16; a printer 18; and, a mouse 20. Additionally, the host data processing center is linked with a database server 22. It is understood that the listed peripherals could be removed and/or additional peripheral devices could be included with the host data processing center 10 as system or local needs require.

The host data processing center 10 is linked 50 to one or more remote nodes. It is contemplated that a remote node could be co-located with the host data processing center 10 if local needs require. The linkage 50 can be through wireless or hardwire needs or a combination of both as network needs dictate. The linked data processing center and nodes can be part of a local area network (LAN), a wide area network (WAN), or as part of an internet or intranet network. Each of the nodes will generally have a CPU 30 linked to: a monitor 32; a keyboard 34; a printer 38; and, a mouse 36. It is understood that the listed peripherals could be removed and/or additional peripheral devices could be included with the remote node as system or local needs require.

Figure 2:
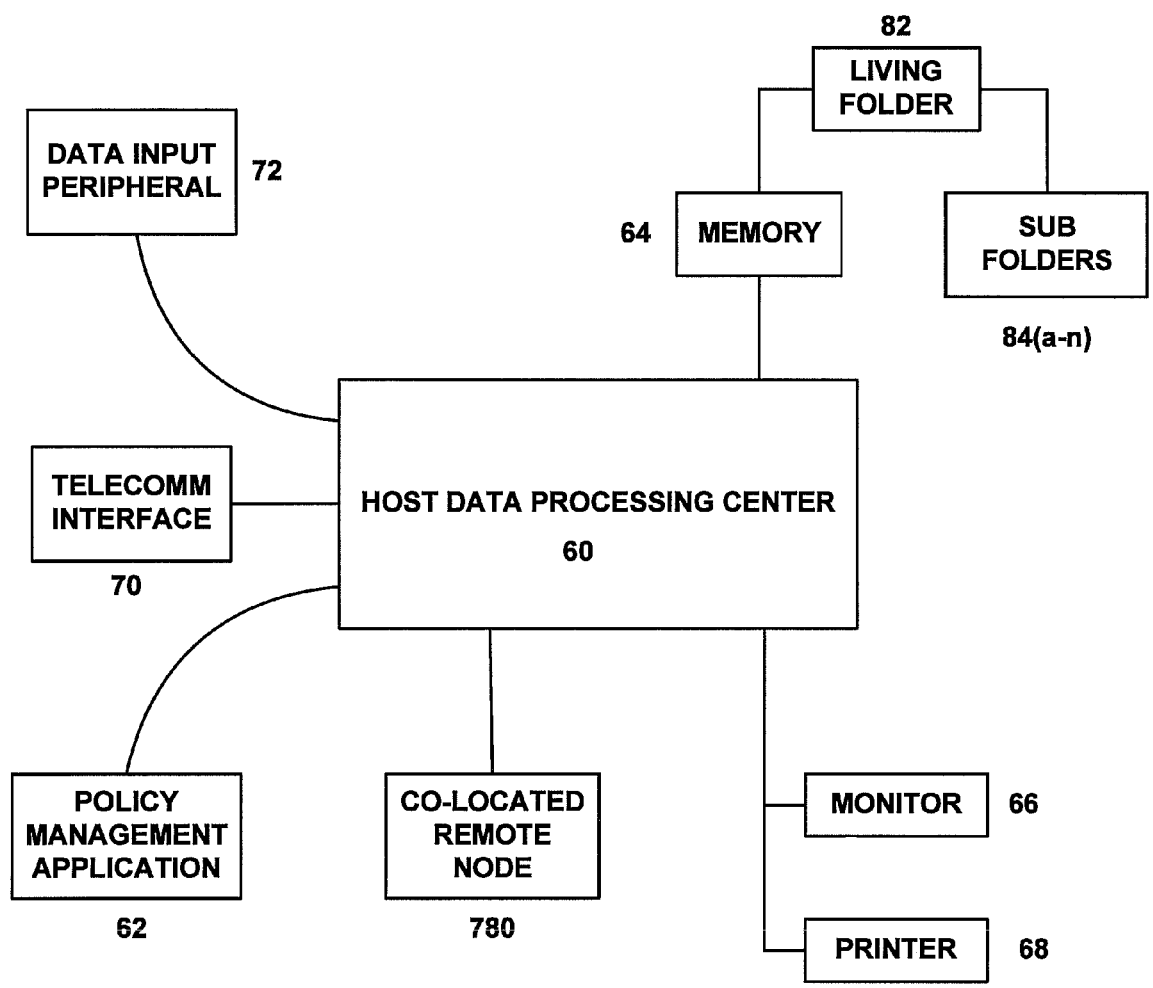
FIG. 2 is a block diagram of the host data processing center.

FIG. 2 is a block diagram of the host data processing center 10 having a CPU 60. The CPU 60 is interoperatively connected to: a policy management application 62 which drives the system flow; a memory 64; a monitor 66; a printer 68, a telecomm interface 70 for linking with remote nodes; a data input peripheral 72 such as a mouse or scanner; and, a possible co-located remote node 80. Memory 64 is further divided to store a living folder 82 in addition to the data bases required for system functionality. The living folder 82 is further subdivided into sub-folders 84a-n.

An important aspect of the present invention is the creation of the living folder 82 that can accept or donate data relative to each insurance holder's policy or application. The host data processing center 10 further comprises a data management routine for directing data to each of the sub-folders 84a-n in accordance with a pre-established set of criteria associated with each of the sub-folders.

In a preferred embodiment of the present invention, the plurality of subfolders 84a-n includes a first sub-folder for storing general information about one or more policies associated with the applicant. Additionally, there may be: a second sub-folder for storing insurance broker information; a third sub-folder for storing details of said one or more policies; a fourth sub-folder for storing endorsements associated with said one or more policies; a fifth sub-folder for storing one or more documents associated with said one or more policies; a sixth sub-folder for storing communications in respect of said one or more policies; a seventh sub-folder for storing notes relative to said one or more policies; and an eighth folder for storing task requests relative to said one or more policies.

Figure 3:
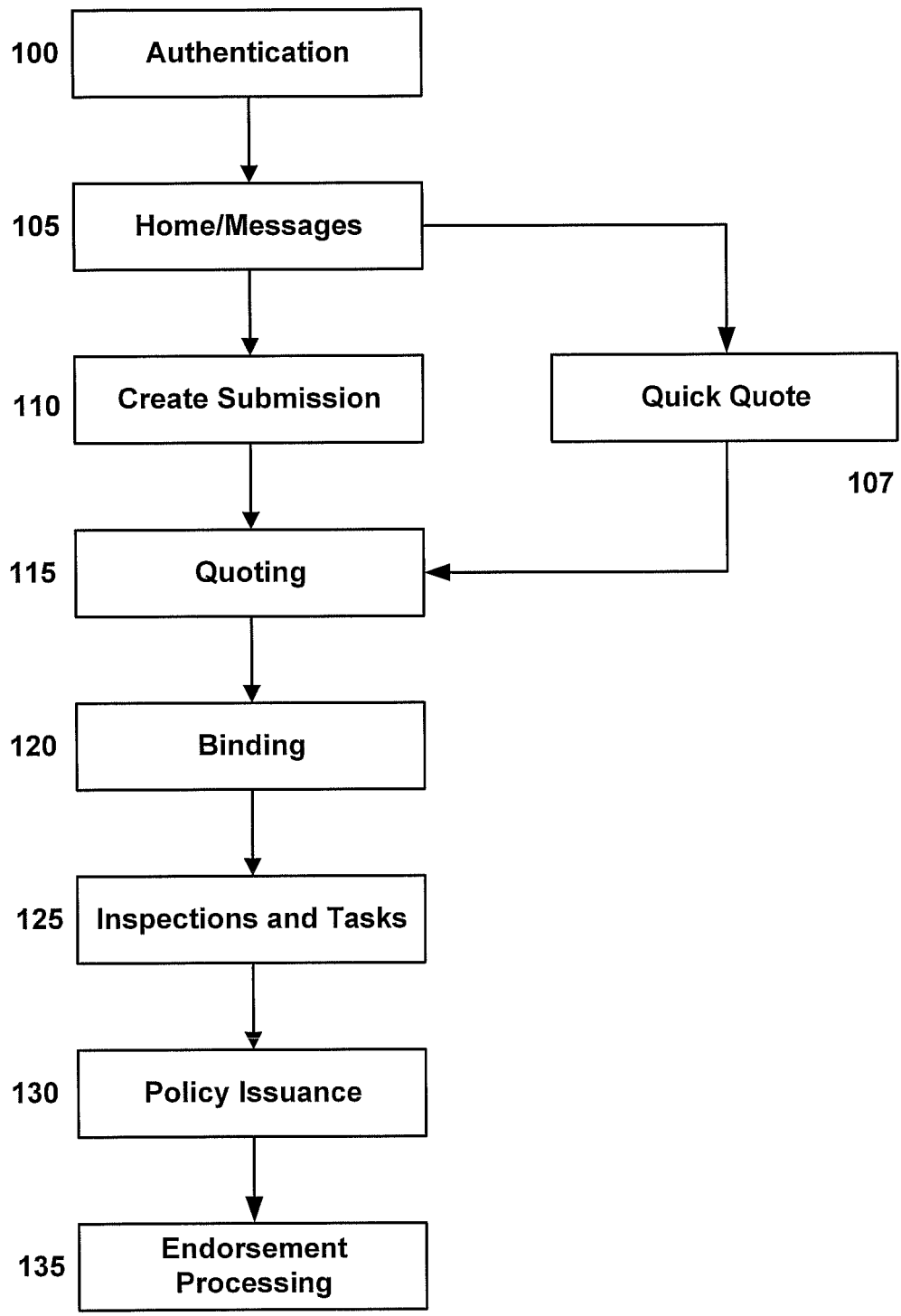
FIG. 3 is an upper level flowchart of the method of the present invention.

FIG. 3 is a top level flowchart of the method of the present invention. Each of the steps listed in this figure are further described in FIGS. 4-12.

The flow begins with the authentication routine of step 100 which validates the use of the system by a system user before advancing to the home/messages routine of step 105. This routine is described in more detail in FIG. 5. At step 105, the system will allow the user to select whether or not a "Quick Quote," as opposed to a detailed policy quote, is required for the policy applicant. If the Quick Quote is selected, then the system advances to step 107 where the quick quote routine is initiated. This routine is further described in detail in FIG. 12. From the Quick Quote, the system flow advances to step 115. If, however, the Quick Quote was not selected at step 105, then the system flow advances to step 110 where the routine for establishing a detailed submission is initiated.

Figure 6:
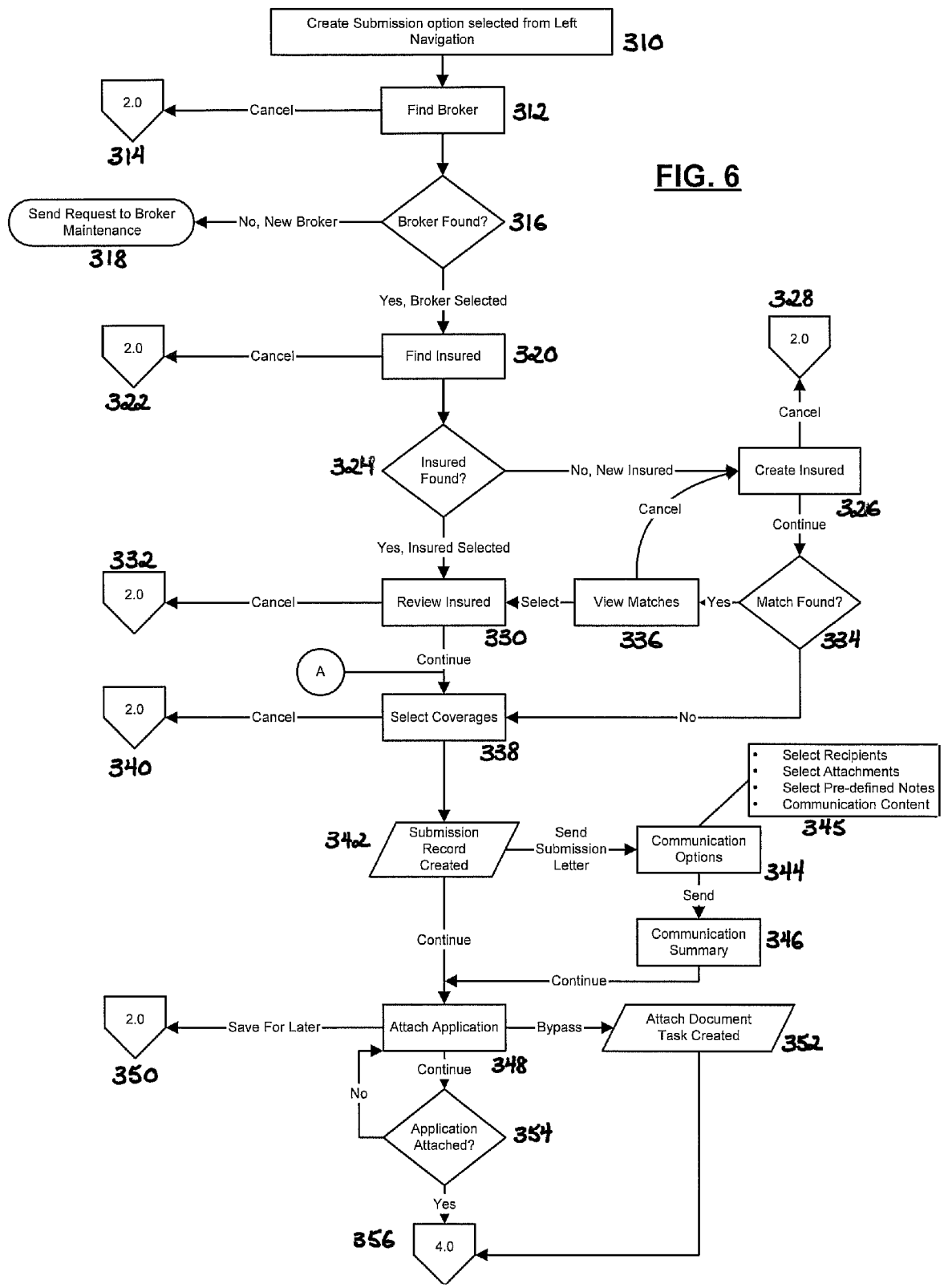
FIG. 6 is a flowchart of the "create submission" routine workflow.

The detailed submission routine, which is described in more detail in FIG. 6, is utilized to produce the input necessary for the quoting routine at step 115. If the policy applicant accepts the quote established at step 115, then the applicant is bound at step 120 (see FIG. 8). From step 120, the system advances to step 125 where certain inspections and tasks (such as a dwelling inspection, a medical exam, or similar tasks) are set-up. These are later described in more detail in FIG. 9. The insurance policy is generated at step 130, and as later described in detail in FIG. 10. The inspections and tasks are completed and the results of these drive the production of endorsements in step 135. Endorsements are changes or additions to the issued policy which are unique to the conditions and requirements of a specific insured.

Figure 4:
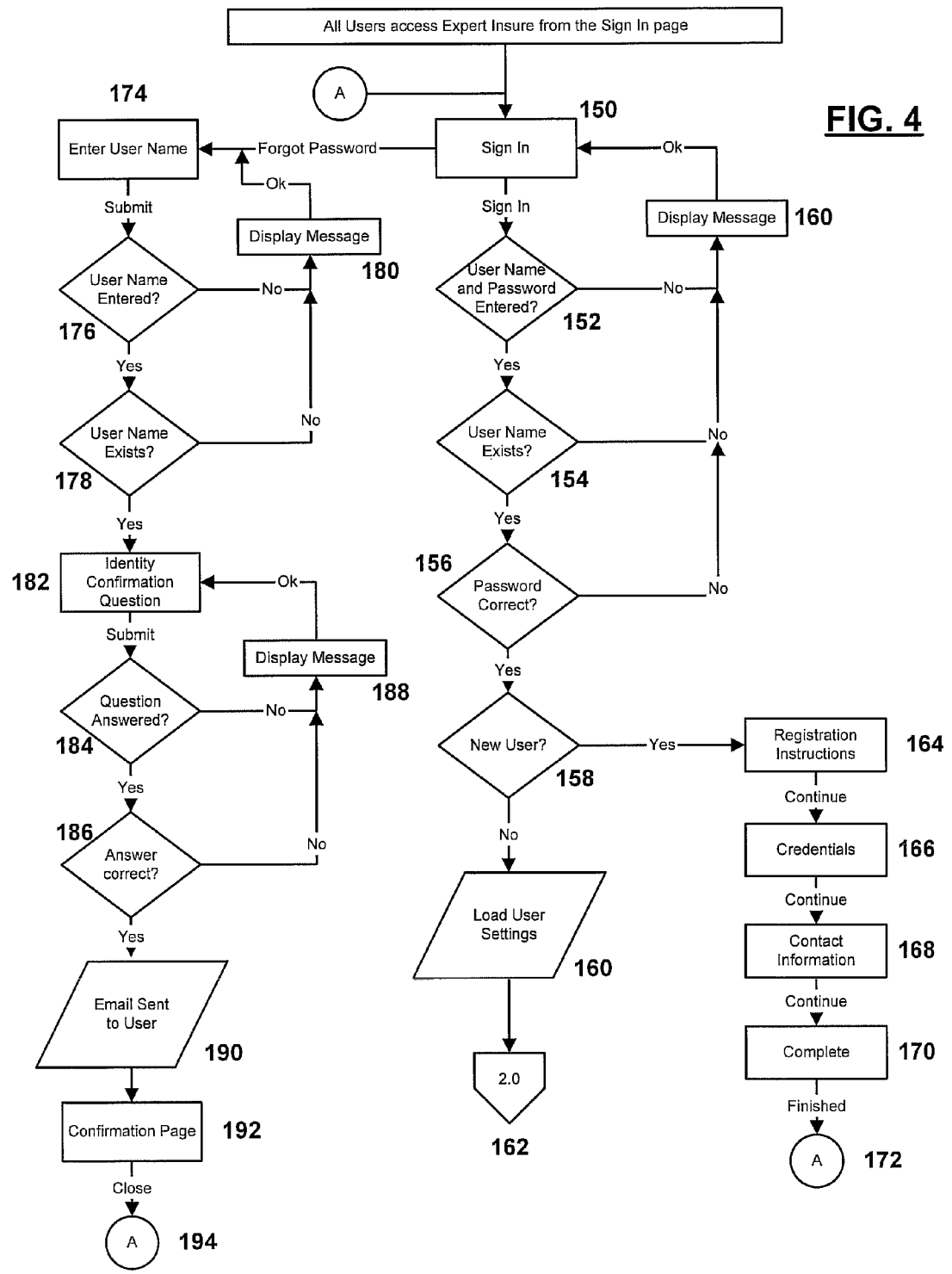
FIG. 4 is a flowchart depicting the "authentication" workflow.

Turning next to FIG. 4, there is shown a flowchart depicting the "authentication" workflow of the present invention.

Access to the re-authentication process begins from the system Sign-In page by advancing to the sign-in routine at step 150. From step 150, the system advances to the query at step 152 which asks if the user name and password have been entered. If the response to the query is "NO", then the system displays a message to the user at step 160 and returns to the sign-in step at 150. If, however, the response to the query at step 152 is "YES", then the system advances to the query at step 154 which asks if the user name exists. The system performs a match of the input with the names and passwords of approved users; and, if the name matches, then the system advances to the query at step 156. However, if the response to the query at step 154 is "NO", then the system displays a message to the user at step 160 and returns to the sign-in step at 150.

Returning to step 156, if the password matches, then the system advances to the query at step 158. However, if the response to the query at step 156 is "NO", then the system displays a message to the user at step 160 and returns to the sign-in step at 150. At step 158, the system queries as to whether or not a new user is logging in. If the response to the query is "YES", then the system advances to step 160 where the appropriate user settings are loaded for advancing at step 162 to the home/messages functionality as is shown in FIG. 4. If the response to the query at step 158 is "NO", however, then the system advances to step 164 which displays registration instructions that direct the user to input their credentials at step 166, their contact information at step 168, and to complete the registration at step 170 before advancing along path A to re-enter the flow at step 150.

Returning to step 150, if the user does not have a password, or they have forgotten it, they are directed to step 174 where they enter their user name. The name is submitted, and the system queries as to whether or not the user name was entered. If the response to the query is "NO", then the system displays an appropriate message and returns the user to step 174. If, however, the response to the query at step 176 is "YES", then the system advances to the query at step 178 which asks if the user name already exists in the system database. If the response to the query is "NO", then the system displays an appropriate message and returns the user to step 174. If the response to the query at step 178 is "YES", however, then the system advances to step 182 where an identity confirmation question is posed to the system user. The user entry is submitted which advances the user to the query at step 184.

At step 184, the system queries as to whether or not the question posed at step 182 was answered by the user. If the response to the query is "NO", then the system displays an appropriate message and returns the user to step 182. If the response to the query at step 184 is "YES", then the then the system advances to the query at step 186 which asks if the response from the user at step 182 was correct. If the response to the query is "NO", then the system displays an appropriate message and returns the user to step 182. If the response to the query at step 186 is "YES", then the system generates an e-mail message to be sent to the user. The e-mail message includes the password for use by the user. The system then advances to step 192 where a confirmation of the transaction is displayed before the system advances along path A to return to the system flow at step 150.

Figure 5:
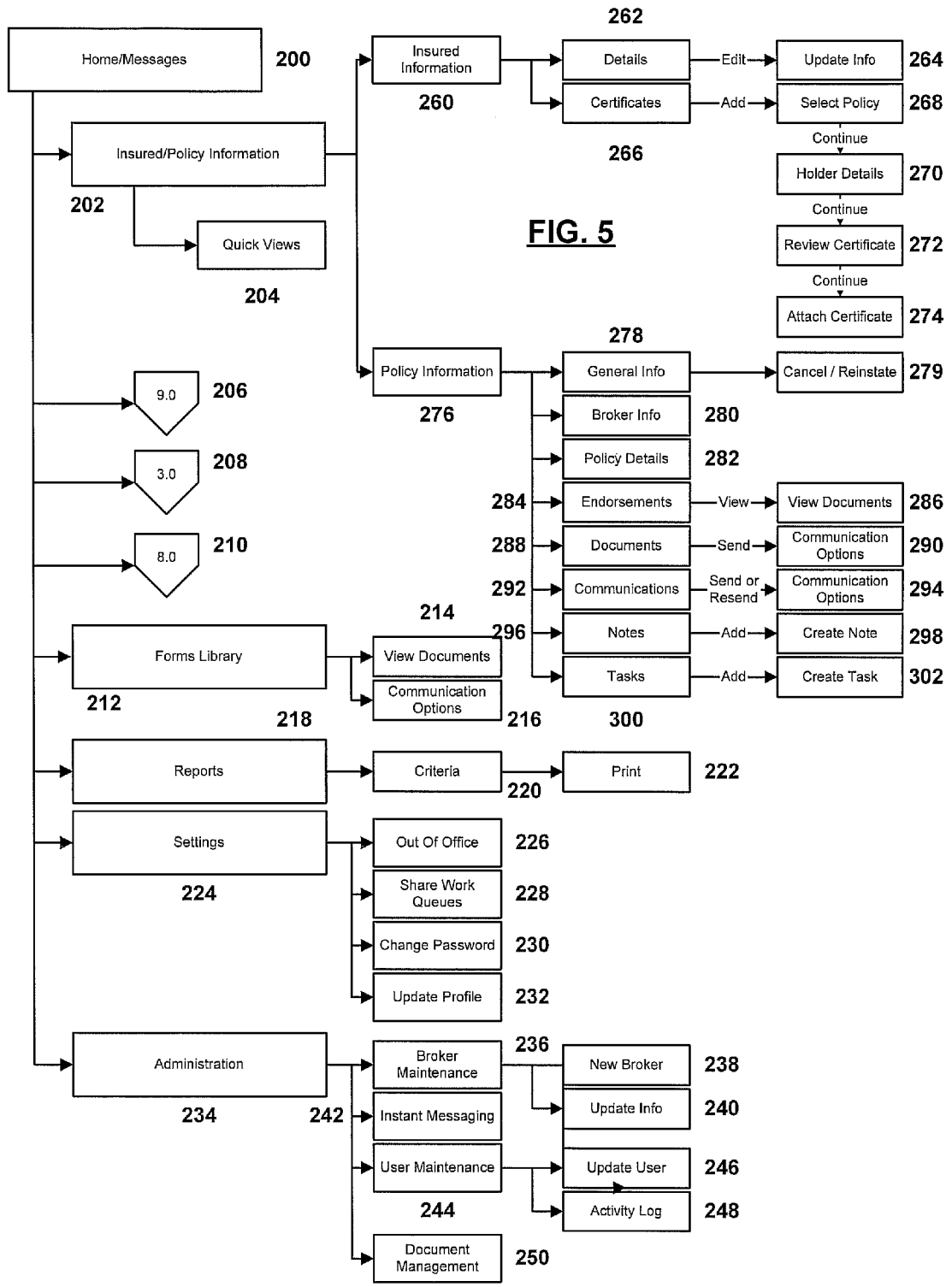
FIG. 5 is a flowchart of the "home/messages" system functionality.

FIG. 5 is a flowchart of the "home/messages" system functionality. Entry to the functionality occurs at step 200 which displays a user screen further divided into subwindows. The subwindows display messages from the system to the logged-in user, listing of recent submissions to the system that are pertinent to the user, current sessions being conducted by the system with other local users and other communication. From step 200, the flow allows selection of insured/policy information at step 202. The information displayed at step 202 includes details as to a particular insured, a listing and detail of existing submissions for an insured and related contact information for each entry. From step 202, the system permits a "quick view" at step 204 of the submission information listed for any selected submission.

From step 202, the user can "dig" deeper into the details associated with any account by selecting the insured information flow at step 260 or the policy information flow at step 276.

Beginning at step 260, insured information (details pertaining to the insured client) can be viewed in more detail at step 262. This detail includes name and contact details, a description of the entity involved, and other pertinent data. The detail can be edited, if required, thus producing an update at step 264. Also from step 260, the user can select details concerning certificates of insurance associated with a particular insured. These can be viewed at step 266 and augmented at step 268 by the selection of a particular policy linked with the insured. The policy is reviewed at step 270 as to the certificate holder details; the corresponding certificate can be viewed at step 272 and attached to the insured details at step 274.

Returning to step 276, the general information and details relative to a particular policy can be viewed. General or overview information can be viewed at step 278; and, the cancellation or re-instatement of any particular submission can be affected at step 279 where an electronic signature is required for authenticating the action to be taken.

In addition to the general information to be viewed, policy information step 276 can flow to broker/dealer information at step 280. Policy details can be viewed at step 282. These include, but are not limited to: type of coverage; coverage limits; policy costs; locations of insured subject matter, etc. A breakdown of endorsements on a per-policy basis can be reviewed at step 284, with a further selection of individual document views available at step 286. Selected or reviewed documents at step 288 can be sent via e-mail or similar vehicle based on selections made at step 290. The status of communications can be viewed at step 292 and the sending or resending of documents can be affected based on selections made at step 290. Notes to or from the system can be viewed at step 296 and additional notes created at step 298. The creation of tasks associated with a particular policy can be viewed at step 300 and new tasks created at step 302.

Returning to the system flow at step 200, the system user, at this point, has the ability to select movement to the Quick Quote routine at step 206, the create submission routine at step 208, and the endorsements routine at step 210. Each of these routines is described in more detail in FIGS. 12, 6 and 11 respectively. Also from step 200, the user can access the forms library at step 212.

The document library lists all of the forms or templates that can be used for the building of a policy or its supporting paperwork. From entry to the library, specific documents can be viewed at step 214 and communication options for transmitting documents or forms can be selected at step 216.

Also available for access from step 200 is the reports detail available at step 218. By selecting specific criteria at step 220, customized or standardized reports can be generated and printed at step 222.

A settings step 224 is also available from step 200. This step allows the user to access various parameters associated with other system users. These parameters include the establishment, at step 226, of "out of office" settings associated with certain individuals; the sharing of work queues at step 228, the changing of passwords at step 230 and updating of user profiles at step 232.

The final step available from step 200 is the administration step 234. From this step, insurance broker maintenance (updating of file details) can be accomplished at step 236, with new brokers added at step 238, or updated information being provided at step 240. Additionally, from step 234, instant messaging functionality can be accessed through pop-up windows associated with selected individual recipients. User maintenance can be controlled though step 244 with new users being added at step 246 or activity logs being created and viewed at step 248. Document management is available at step 250.

Next, we turn to FIG. 6 which is a flowchart of the "create submission" routine workflow. The workflow begins at step 310 where the create submission routine can be selected before advancing to step 312. At step 312, broker specific details can be accessed by entering a broker's name. Clicking on a "New Broker" icon will allow the user to request creation of a new broker field. From step 312, the system advances to the query at step 316 which asks if a broker has been found. If the response to the query is "NO", then the system advances to step 318 which allows the request for a new broker entry to be sent to Broker maintenance for input. If, however, the response to the query at step 316 is "YES", then the broker is selected and the system advances to step 320.

At step 320, insured details can be accessed to locate a specific insured. If the user cancels the search for the insured, then the system advances via step 322 to the home messages functionality as is further described in FIG. 5 above. From step 320, the system advances to the query at step 324 which asks if the insured has been found. If the response to the query is "NO", the system treats the insured's name as a "new" insured and allows appropriate details to be entered into the system at step 326. If the user chooses not to continue, then the system advances to the home/message functionality via step 328. However, if the user does continue, then the system advances to the query at step 334 which asks if a match has been found between the newly created insured file, and any existing file.

If the response to the query at step 334 is "YES", then the system allows the user to view the matched files at step 336. If the matched view is cancelled, then the system returns to step 326; otherwise, the system advances to step 330 where the insured details are reviewed. If the user cancels the review at step 330, then the system will return to the home/messages functionality as is shown in FIG. 5. However, if the user continues, then the system will advance to step 338 where specific policy coverages are selected.

Returning to the query at step 334, if a match is not found, then the system will advance to step 338 where specific policy coverages are selected. From step 338, the selection can be cancelled at step 340 before returning to the home/messages functionality as is shown in FIG. 5. If the select coverages step is continued, then the system will advance to step 342 where a submission record is created. A copy of the submission letter is generated and transmitted at step 344 after selecting various options at step 345. These options include: selection of recipients; selection of attachments; selection of pre-defined notes to the file; and, communication content. A communications summary is generated at step 346, and the system flow returns to enter just prior to step 348.

At step 348, the insurance application is attached to the file. At this point, several alternatives are possible based upon user selection. If the user wishes to bypass the immediate attachment of the application, then an "attachment document" task can be created at step 352 which allows the user to set-up a future application attachment. From step 352, the system flow would allow access to the quoting routine (as described in more detail in FIG. 7) at step 356. However, if the user, at step 348, decided to save the application attachment for a later time, without establishing the specific task, then the system would advance to step 350 where the flow would return to the home/message functionality. A third alternative at step 348 allows the user to advance to the query at step 354 which asks if the application is attached. If the response to the query is "NO", then the flow circles back to step 348. If the response to the query at step 354 is "YES", then the flow advances to step 356 as noted above.

Figure 7:
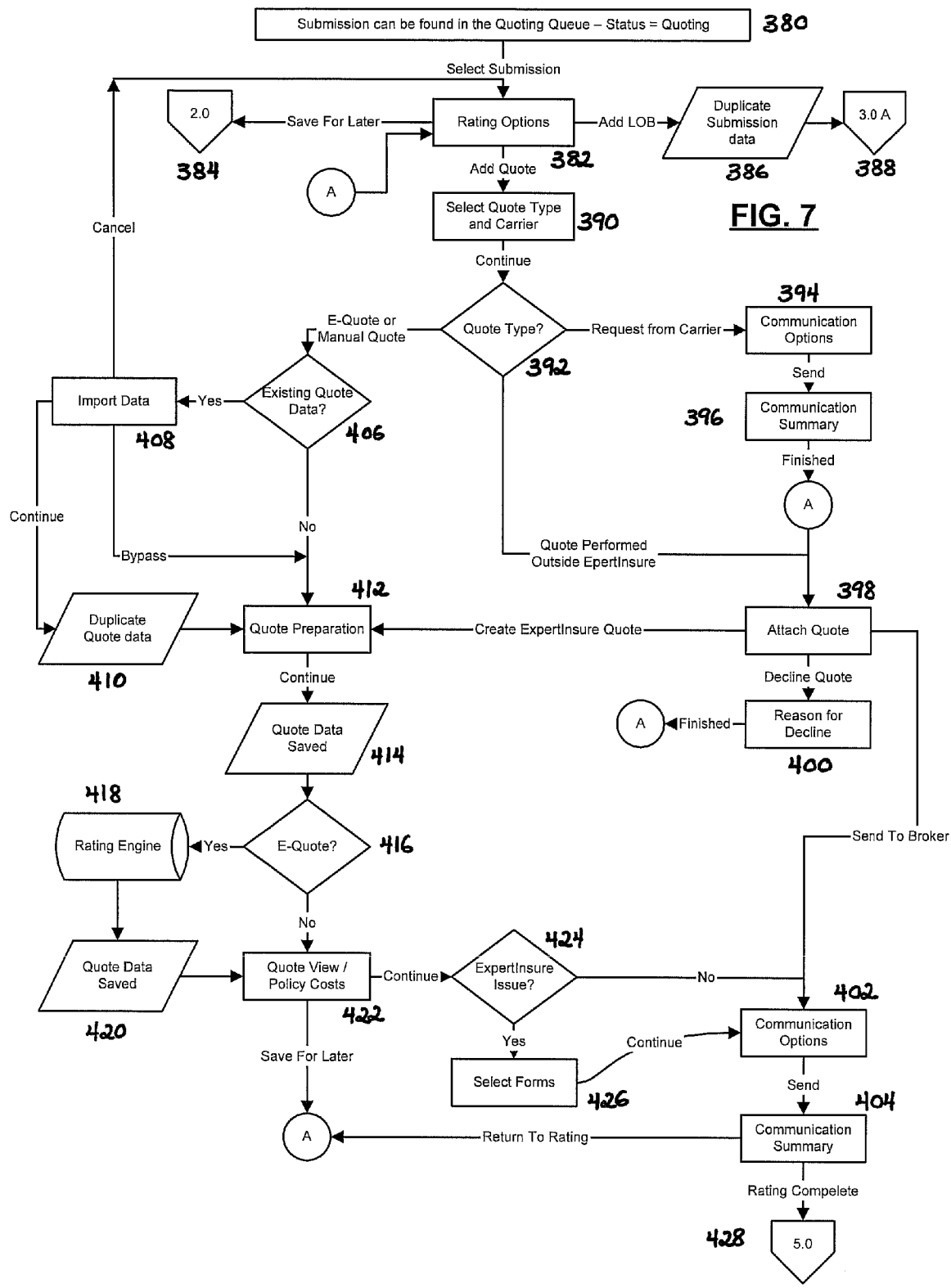
FIG. 7 is a flowchart of the "quoting" routine workflow.

Turning next to FIG. 7 there is shown a flowchart of the "quoting" routine workflow for the present invention.

The quoting routine begins at step 380 where a particular insurance application submission is selected and transmitted to a rating options step 382. The rating options are displayed on the appropriate screen with a header that identifies the applicant. The quote data is subdivided by quote type, date, wholesaler or carrier, the cost of each element, and the status of the submission. If the user decides to save the rating options for later, than the user can do so at step 384 before returning to the home/message functionality of FIG. 5. If, however, the user wishes to add an additional line of business, then the system will duplicate the submission data at step 386 before returning, at step 388, to the quoting workflow as described in FIG. 6.

From step 382, the system advances to step 390 where the insurance carrier and quote type are selected. From step 390, the system advances to the query at step 392 which asks what quote has been selected. If the response to the query is "Carrier Request" then the system advances to step 394 where the appropriate communications option is selected for responding to the carrier. From step 394, the system advances to step 396 where a communications summary is generated before finishing and returning along path A to rejoin the flow at step 382. If the response to the query at step 392 is "Quote from Outside System", then the system advances to step 398 where the outside quote is attached to the file. If the response to the query at step 392 is "E-Quote" or "Manual quote", then the system advances to the query at step 406.

At step 398, there are three routes that the system can follow. If a system quote is to be created, then the system will flow from step 398 to step 412 which described below. Once the quote has been attached at step 398, a copy is sent to the broker by selecting the appropriate communications vehicle at step 402. However, if the quote is declined by the potential insured, then the system logs the reason for the declination at step 400 before finishing and returning along path A to step 382.

Returning to step 406, the system queries as to whether or not there is existing data for establishing the quote. If the response to the query is "YES", then the system advances to step 408 to import the data from the appropriate location. If the data importation at step 408 is canceled, then the system will re-enter the system flow at step 382. If the data import step is bypassed, then the system flow will advance to step 412 where the quote is assembled by the system. If, however, the import data step is continued, then the system will advance to step 410 where the quote data is duplicated before advancing to the quote preparation of step 412.

From step 412, the system advances to step 414 where the quote data is saved to the system memory before advancing to the query at step 416. At step 416, the system queries as to whether or not the quote will be established as an E-quote (electronic quote). If the response to the query is "YES", then the system advances to the rating engine of step 418 where the quote is determined before advancing to step 420 where the quote data is saved. From step 420 the system advances to step 422 where the quote can be viewed and the individual policy costs detailed. The details include policy costs, taxable and non-taxable fees, and carrier fees.

Returning to the query at step 416, if the response to the query is "NO", then the system advances directly to step 422. At step 422, if the user decides to suspend their activity until a later time, then the system advances along path A to re-enter the flow at step 382. However, if the user continues with the process, then the system advances to the query at step 424 which asks if the policy is being issued by the system. If the response to the query is "YES", then the system prompts the user to select the appropriate forms at step 426 before continuing to step 402 where the various communications options for transmitting the quote are displayed. After selecting the communication option and sending the quote, a communication summary is produced for the file at step 404 before either returning to step 382 via path A, or completing the rating sequence and advancing, at step 428, to the binding routine as is shown in FIG. 8.

Figure 8:
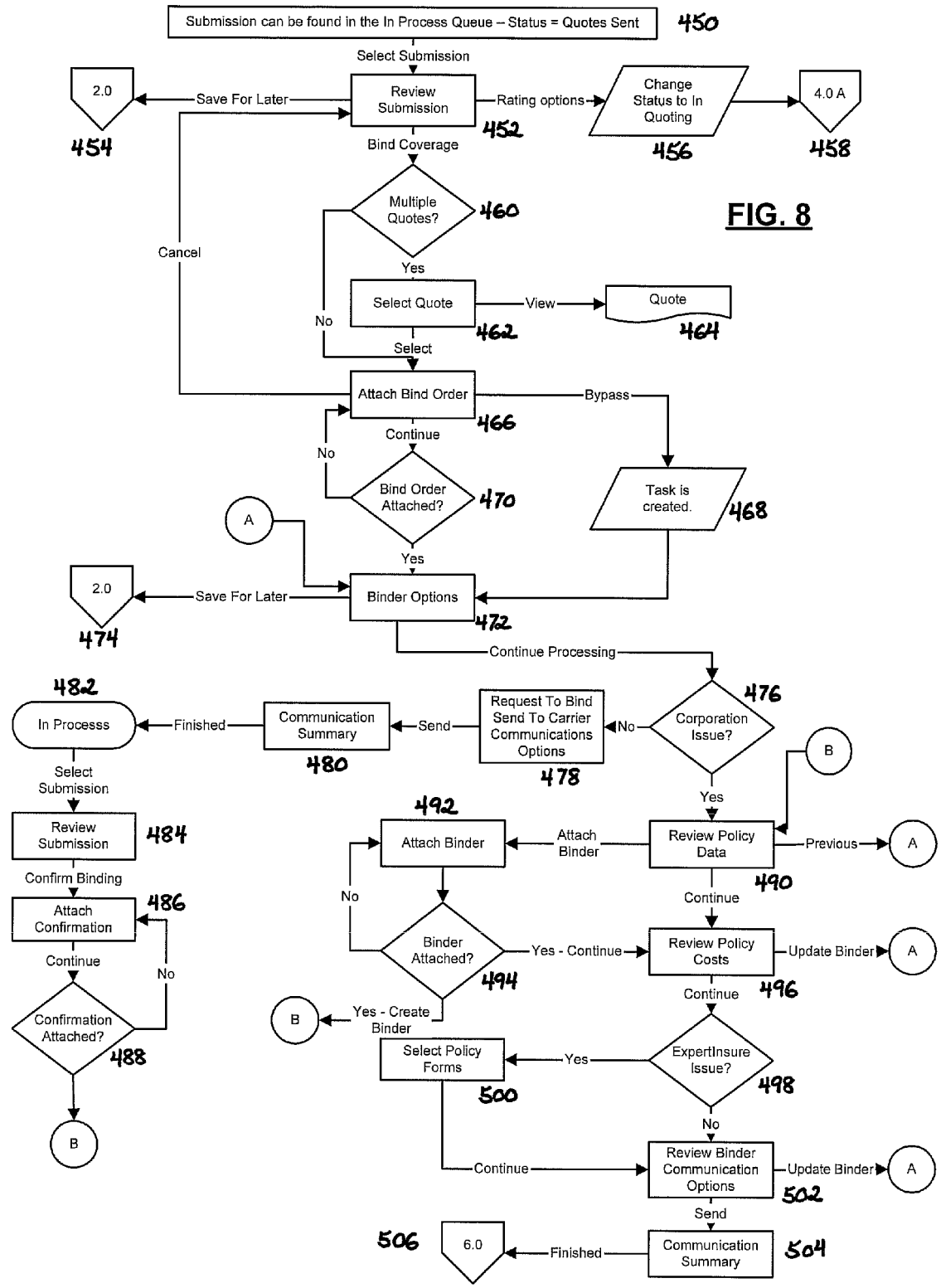
FIG. 8 is a flowchart of the "binding" routine workflow.

FIG. 8 is a flowchart of the "binding" routine workflow. The routine begins at step 450 where a submission (with a quote sent) is in the system's process queue. A particular submission is selected and then reviewed at step 452. If additional rating options are added or required, then the system advances to step 456 where the submission's status is changed to "quoting" and then sent back, via step 458, to the quoting workflow (as is shown in FIG. 7) to re-enter at step 382. If, however, the user decided to suspend action until a later time, then the system advances to step 454 where the system returns to the home/message routine.

If the user has determined that the coverage detailed in the submission is to be bound, then the system advances to the query at step 460 which asks if a selection is to be made from among multiple quotes. If the response to the query is "YES", then the quote is selected at step 462, and can be viewed by the user at step 464. The bind order is attached to the file at step 466. If the response to the query at step 460 is "NO", then the system advances directly to step 466.

At step 466, if the user decides to bypass the attachment sequence of steps 466 and 470, then the system advances to step 468 where a task is created. Tasks are actions that occur after a policy is bound. Tasks may include real estate or building inspections, requests for missing documents, requests for required data within the living folder, or similar actions whose results will lead to endorsements to be added to the policy. From step 468, the system advances to step 472 where certain binder options may be selected. These may include such options as terrorism coverage, or the name of the inspection company (for performing certain tasks).

Returning to step 466, if the binder order is attached, the system advances to the query at step 470 which asks if the bind order is attached. If the response to the query is "NO", then the system returns to step 466. However, if the response to the query at step 470 is "YES", then the system advances to step 472 where certain binder options may be selected. From step 472, the user can save their work for later and be returned, via step 474, to the home/message functionality of FIG. 5; or, the user can continue processing by advancing to the query at step 476.

At step 476, the system queries as to whether or not the policy will issue to a corporation. If the response to the query is "NO", then the system advances to step 478 where the request to bind the policy will be sent to the appropriate insurance carrier via a selected communications option. From step 478, the request is sent to the carrier and a communications summary is generated at step 480 before moving to an "in process" status at step 482. The submission is selected and reviewed at step 484; the binding confirmed and the confirmation attached to the file at step 486. The system then moves to the query at step 488 which asks if the confirmation has been attached to the file. If the response to the query is "NO", then the system returns to step 486. If, however, the response to the query at step 488 is "YES", then the flow advances along path B to re-enter the system flow at step 490.

Returning to the query at step 476, if the response to the query is "YES", then the system advances to step 490 where the policy data is reviewed. From step 490, the flow advances to step 496 where the policy costs are reviewed and the binder updated if necessary. The user has the option of attaching the binder to the file at step 492 before advancing to the query at step 494. Step 494 asks if the binder is attached to the file. If the response is "NO", then the system returns to step 492 to attach the binder. If the response to the query at step 494 is YES", then the system continues to step 496 where the policy costs are reviewed and the binder updated if necessary.

From step 496, the system advances to the query at step 498 which asks if the system will be issuing the policy. If the response to the query is "YES", then the system advances to step 500 where the appropriate forms are selected before rejoining the flow at step 502. If the response to the query at step 498 is "NO", however, then the system advances directly to step 502 where the binder communication options are reviewed and the binder sent. A communications summary is produced at step 504 and the routine is finished at step 506 before advancing to the inspections and task routine as is further described in FIG. 9.

Figure 9:
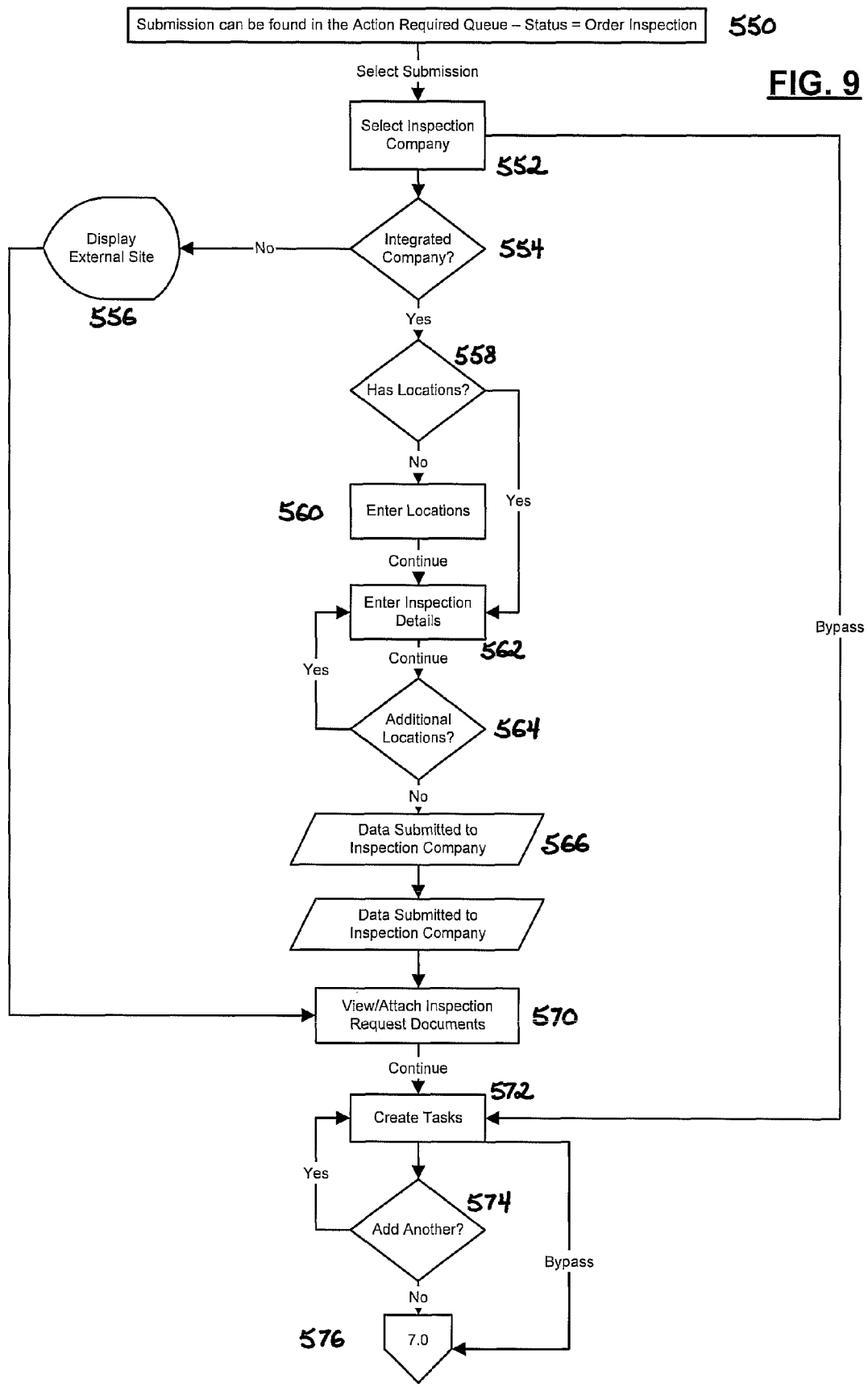
FIG. 9 is a flowchart of the "inspections and tasks" routine workflow.

Turning then to FIG. 9, there is shown a flowchart of the "inspections and tasks" routine workflow. The routine begins at step 550 where a submission is selected from the "action required" work queue. The system advances to step 552 where an inspection company is selected to perform an inspection of the insured property or individual as required. From step 552, the system advances to the query at step 554 which asks if the inspection company is integrated with respect to access to the system for scheduling the services offered (i.e., multiple locations, services for various inspection types, or testing capabilities). If the response to the query is "NO", then the external site is displayed on the monitor at step 556 before advancing to step 570 where the inspection request documents can be viewed and/or attached to the file. If, however, the response to the query at step 554 is "YES", then the system advances to the query at step 558 which asks if the inspection company has received the listing of various locations where inspections are to be made. If the response to the query is "YES", then the system advances directly to step 562 where the location details are entered. If the response to the query at step 558 is "NO", then the inspection locations are entered at step 560 before advancing to step 562 for the entry of location details.

From step 562, the system advances to the query at step 564 which asks if there any additional locations for scheduling. If the response to the query is "YES", then the system returns to step 562; however, if the response to the query at step 564 is "NO", then the system advances to step 566 where the data is submitted to the inspection company before advancing to step 570.

At step 570, the inspection request documents can be viewed and/or attached to the file before the individual inspection tasks are created at step 572. The system then queries at step 572 whether or not there are additional tasks to be created. If the response to the query is "YES", then the system returns to step 572. If, however, there are no additional tasks to be added, then the system advances to the policy issuance routine via step 576.

Figure 10:
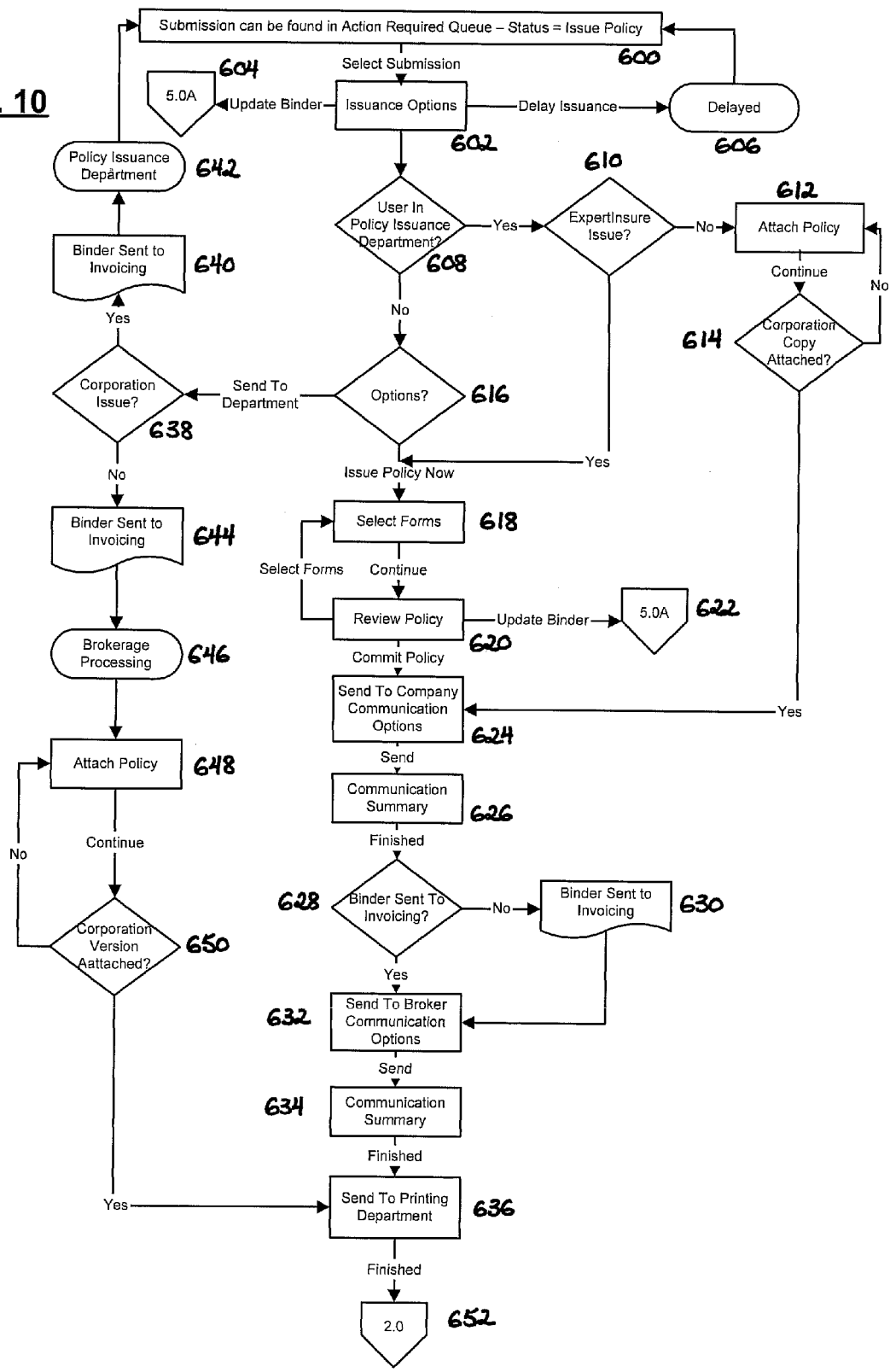
FIG. 10 is a flowchart of the "policy issuance" routine workflow.

Turning next to FIG. 10, there is shown a flowchart of the "policy issuance" routine workflow which begins at step 600. From step 600, the system selects a submission and advances to step 602 where the issuance options are displayed. The options generally include selections for: send to policy issuance now; issue the policy now selection; delay the policy issuance; or, update the binder. If "update binder" is selected, then the system returns, via step 604, to the binding workflow at step 472. If the "delay" option is chosen, then the submission is delayed at step 606, and the submission is returned to the queue at step 600. If either of the other two choices is selected at step 602, the system advances to the query at step 608.

At step 608, the system queries as to whether or not the user is in the policy issuance department. If the response to the query is "YES", then the system advances to the query at step 610 which asks if the policy issuance is being down by the system. If the response to the query is "NO", then the system attaches the policy at step 612 before querying as to whether or not the corporation copy is attached to the file. If the response to the query is "NO", then the system returns to step 612 to attach the policy. If, however, the response to the query at step 614 is "YES", then the system advances directly to step 624 where the company communication options can be selected.

Returning to the query at step 610, if the response to the query is "YES", then the system will prepare to issue the policy and advance to step 618 for selection of the appropriate forms.

Returning to the query at step 608, if the response to the query is "NO", then the system advances to the query at step 616 which asks if there are issuance options. If the issuance request is sent to the policy issuance department, the system will advance to the query at step 614; otherwise, if the response to the query at step 616 is to issue the policy now, then the system will advance to step 618 to select the appropriate forms for issuing the policy.

From step 618, the system advances to step 620 where the policy is reviewed as to details concerning: the insured; the producer; the agent; the company covering the insurance; the forms selection; any binder updates; and, the policy commitment. If the binder is to be updated, then the system returns to the binding routine via step 622. If the forms selection is to be adjusted, then the system returns to step 618. After review, the policy is committed and sent to the company, at step 624, via one of the communication options. The communication summary memorializing the transmission is generated at step 626.

Returning to the query at step 638, the system asks if the corporation will be issuing the policy. If the response to the query is "YES", then the system advances to step 640 where the binder is sent to invoicing, then to step 642 for receipt by the policy issuance department. From step 642, the system returns to step 600. If the response to the query at step 638 is "NO", then the binder is sent to invoicing at step 644, but then advances to step 646 where the binder is sent to brokerage processing. A copy of the policy is attached at step 648 before advancing to the query at step 650. The query at step 650 asks if the corporation version is attached to the file, if the response to the query is "YES", then the system advances to step 636 where the policy is sent to the printing department. If the response to the query at step 650 is "NO", then the system returns to step 648 to attach the policy before being sent on to the printing department.

Returning to step 626, the system advances to the query at step 628, which asks if the binder has been sent to invoicing. If the response to the query is "NO", then the binder is sent to invoicing at step 630 before advancing to step 632. If the response to the query at step 628 is "YES", then the system advances directly to step 632 where the various options for sending the policy to the broker are available for selection. The policy is transmitted and the communication summary is generated at step 634 before finishing the policy issuance and turning over the policy for printing at step 636. From step 636, the system returns, via step 652, to the home/messages routine as is shown in FIG. 5.

Figure 11:
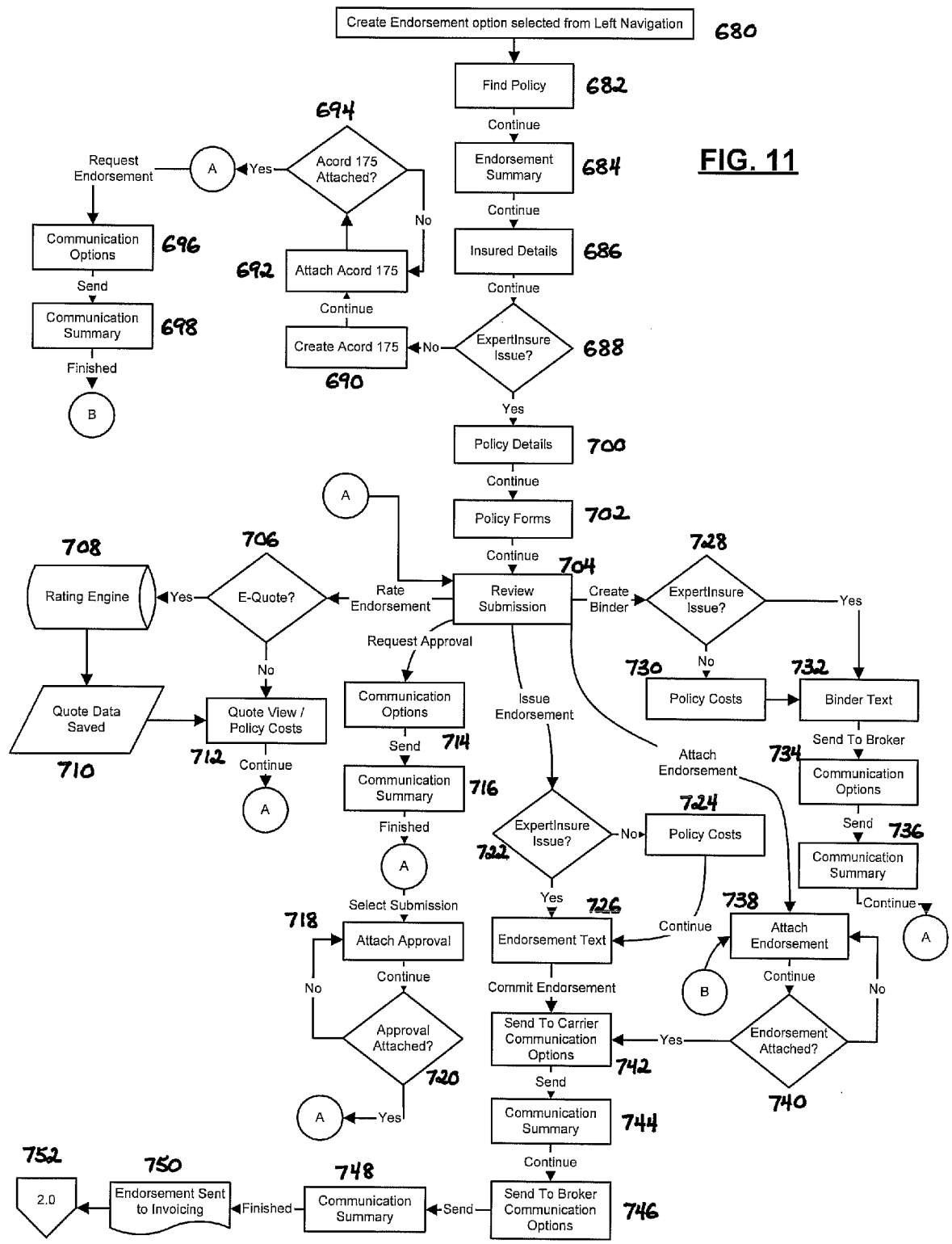
FIG. 11 is a flowchart of the "endorsements" routine workflow.

In FIG. 11, there is shown a flowchart of the "endorsements" routine workflow which begins with the selection of the endorsements routine at step 680. From step 680, the system advances to step 682 where the policy is located in the system through the "Find Policy" screen. The system advances to step 684 where the endorsements to the selected policy are created and summarized before the system moves on to step 686. At step 686, the insured details are reviewed before advancing to the query at step 688.

At step 688, the system queries as to whether or not the system will be issuing the policy with the relative endorsements. If the response to the query is "NO", then the system advances to step 690 where ACORD form 175 is created. Client data is collected in insurance industry standard forms such as those provided by the Association for Cooperative Operations Research (ACORD). From step 690, the system advances to step 692 where ACORD form 175 is attached to the policy before advancing to the query at step 694. At step 694, the query asks if the ACORD form is attached to the policy. If the response to the query is "NO", then the system returns to step 692; otherwise, if the response to the query is "YES", then the system advances to step 696. At step 696, the various communications options available to the user are listed. One option is selected and the policy sent to the proper binding authority. The communications summary is generated at step 698 before the system follows path B to return to the system flow at step 738.

Returning to the query at step 688, if the response to the query is "YES", then the system advances to step 700 where the policy details (policy costs, taxable fees, commissions, etc.) are listed and reviewed before selecting the appropriate policy forms at step 702. From step 702, the system advances to step 704 where the submission is reviewed once again. If a rate endorsement is required, then the system advances to the query at step 706 which asks if the quote is an E-quote (electronic quote). If the response to the query is "YES", then the system advances to the rating engine at step 708 to determine the final quote. The quote data is saved at step 710 before the system makes the quote available for viewing, together with the individual policy costs, at step 712. If the response to the query at step 706 is "NO", then the system advances directly to step 712 before utilizing path A to re-enter the system flow at step 704.

Returning to step 704, if the submission review determines that an approval is required, the request is formatted at step 714 in accordance with the communications options available. The transmission is summarized at step 716. The approval, once granted, is attached to the policy which is verified at step 720 before the system utilizes path A to return to step 704.

Again returning to step 704, if the endorsement is issued, then the system advances to the query at step 722, which asks if the issue is being done by the system. If the response to the query is "NO", then the system advances to step 724 where the policy costs are determined before advancing to step 726 where the endorsement text is generated for the policy. If the response to the query at step 722 is "YES", then the system advances directly to step 726. From step 726, the policy is transmitted to the insurance carrier utilizing the communications options available at step 742. A communication summary is generated at step 744 and the endorsement is sent to invoicing at step 750 before returning the user back to the home/messages routine via step 752.

Returning to step 704 once more, if a binder needs to be created, then the system advances to the query at step 728 which asks if the policy will be issued by the system. If the response to the query is "YES", then the system advances directly to step 732 where the binder text is generated before being sent to the broker. If the response to the query at step 728 is "NO", then the policy costs are determined at step 730 before the system advances to step 732.

From step 732, the system chooses amongst the various communications options available at step 734 before sending the policy with the associated binder text to the broker. The communications summary is generated at step 736 before the system follows path A to return to the flow at step 704. At step 704, the final option available is the attachment of an endorsement which occurs by advancing to step 738. The system verifies, at step 740, that the endorsement has been attached to the policy before advancing to the communications options of step 742.

Figure 12:
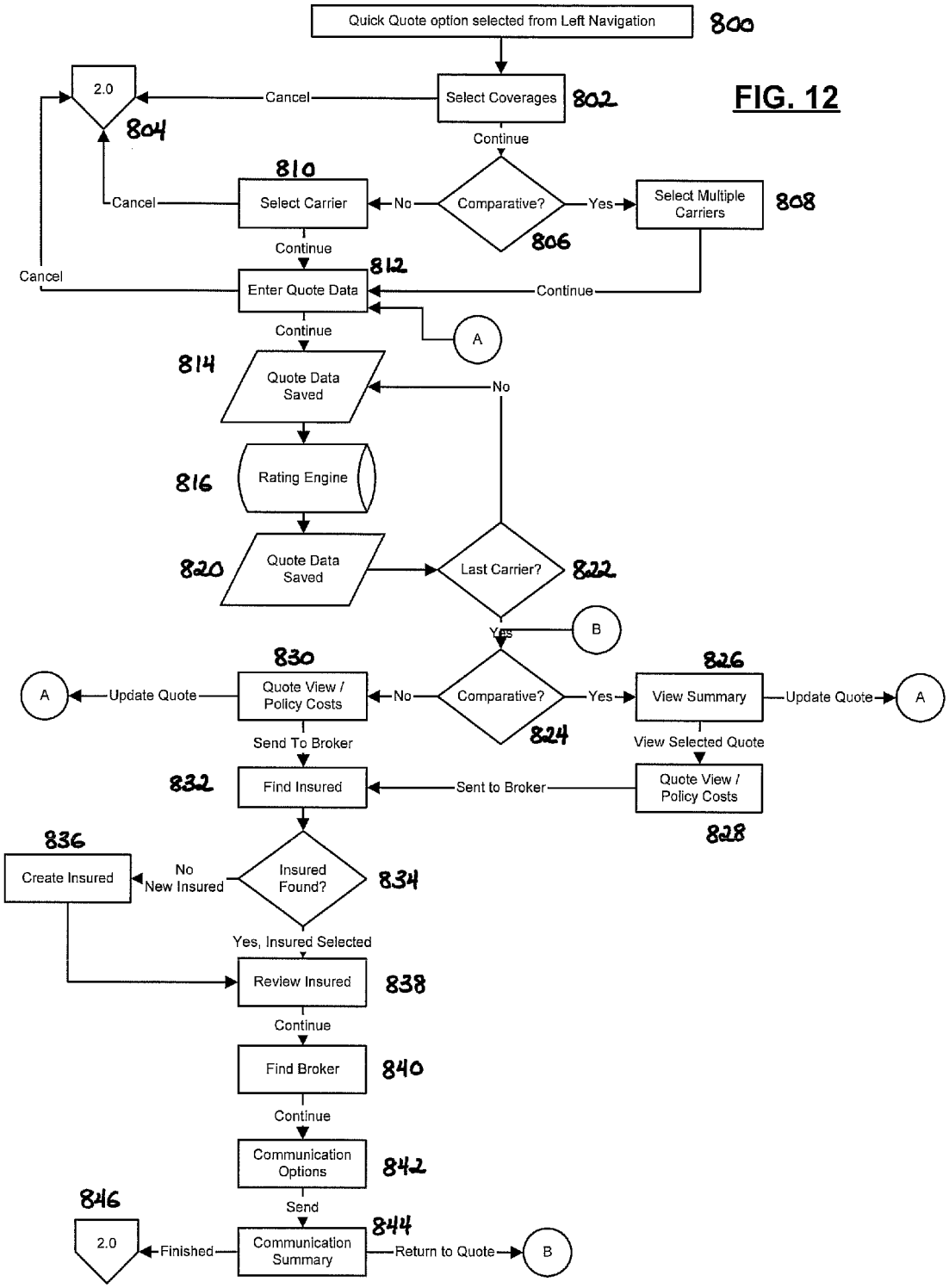
FIG. 12 is a flowchart of the "Quick Quote" routine workflow.

FIG. 12 is a flowchart of the "Quick Quote" routine workflow 107 that is shown in FIG. 3. The routine begins at step 800 where the "quick Quote" routine is selected in relation to select coverages identified in step 802. If the user desires to terminate the routine, then the system advances to step 804 where the user is returned to the home/messages routine. If the user continues with the quick Quote routine, then the system advances to step 806 where the system queries as to whether or not the user wants to compare rates available from more than one insurance carrier. If the response to the query is "YES", then the multiple carriers can be selected for review at step 808 before the system advances to step 812 where the quote data must be entered. If the response to the query at step 806 is "NO", then the system advances to step 810 where a single insurance carrier is selected before the system advances to step 812.

From step 812, the system advances to step 814 where the quote data is saved before utilizing the rating engine of step 816. The rating engine determines a quote for the data entered relative to a carrier. The quote data is saved at step 820 and the system advances to the query at step 822 which asks if the carrier being quoted is the last carrier. If the response to the query is "NO", then the system returns to step 814 where the next carrier quote is determined. If the response to the query at step 822 is "YES", then the system advances to the query at step 824.

The system, at step 824, queries as to whether or not the quote data derived is to be compared. This would only be a factor when multiple carriers have been entered at step 808. If the response to the query is "YES", then the system produces a summary at step 826 and allows the user to view a selected quote at step 828. From step 828, the system advances to step 832 where a particular insured is sought from the system database. Returning to the query at step 824, if the response was "NO", then the single quote and policy costs can be viewed before advancing to step 832.

From step 832, the system verifies that the insured was found before advancing to step 838. If, however, the insured could not be located, then the system advances to step 836 where an insured file is created before advancing to step 838 where the identified insured's file is reviewed. The system then advances to step 840 where the applicable broker is identified before communications options are selected at step 842. The quote is transmitted to the applicable broker and the communication summary generated at step 844 before the routine is ended at step 846 and the user directed to the home/message routine.

In the claims, means, or step-plus-function clauses, are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method for data submission management of insurance application data by a data processing system via a computer processor, said method comprising the steps of:
    a plurality of computer instructions performed via a computer processor and memory chips of:
    (a) authenticating, at a remote node, the submission of data to be entered in said system relative to an applicant;
    (b) matching said authenticated data with a set of one more pre-established routines residing in a memory of said system and corresponding to particular data entry points;
    (c) merging said authenticated data with said matched routines to create a submission, said submission further comprising a set of data fields;
    (d) submitting said submission to a host data processing center to match said set of data fields with a set of price points in a quotation routine to establish a quote in respect of said submission;
    (e) transmitting said quote from said host data processing center to said remote node;
    (f) accepting or rejecting said quote by said applicant, wherein
        (i) if said quote is rejected, then determining whether or not to modify said data to be authenticated; and, if said data is not modified than terminating said routine; or
        (ii) if said quote is accepted, then binding said applicant conditionally and identifying one or more tasks to be performed in respect of said binding;
    (g) issuing a policy to said applicant in respect of said quote;
    (h) performing said one or more tasks; and
    (i) processing a set of one or more endorsements to said policy in respect of a result related to said tasks,
    wherein a computer processor performs in parallel instructions of the steps of:
    (a) accepting an application for entry into said data processing system;
    (b) initiating a policy information routine for matching said insurance application data to a set of one or more data fields of said data processing system said data fields relevant to said application;
    (c) establishing a living folder, said living folder comprising a plurality of sub-folders for storing data relevant to said applicant's application;
    (d) populating, on a real-time basis, each of said sub-folders with data collected from said data processing system as such data is generated by said plurality of routines; and
    (e) allowing said data processing system to query each of said sub-folders and to withdraw data from said each of said sub-folders based upon a set of pre-established criteria and needs.

2. The method of claim 1, wherein said pre-established routines further comprise the steps of:
    (a) determining a set of one or more options that are available to said applicant for construction of said policy; and
    (b) determining a set of administrative options available to said applicant in respect of said data input.

3. The method of claim 1, wherein said pre-established routines further comprise the step of determining said set of one more tasks to be performed subsequent to said policy being issued.

4. The method of claim 1, wherein said data input is utilized by said host data processing center to re-calculate and re-set one or more data fields resident within said memory of said system.

5. The method of claim 2, further comprising the step of generating a report in respect of said data input.

6. The method of claim 1, wherein said pre-established routines are trainable by updating one or more fields with data that is input periodically to reflect market conditions and fluctuations.

7. The method of claim 1, wherein said price points are updated periodically.

8. The method of claim 1, wherein said one or more tasks further comprises inspecting a facility to be covered by said policy.

9. The method of claim 1, wherein said one or more tasks comprises examining an individual to be covered by said policy.

10. A method for data submission management of insurance application data by a data processing system via a computer processor and memory chips, said method comprising the steps of:
    a plurality of computer instructions performed via a computer processor and memory chips of:
    (a) authenticating, at a remote node, the submission of a limited data set to be entered in said system relative to an applicant;
    (b) matching said authenticated limited data set with a set of one more pre-established routines residing in a memory of said system and corresponding to particular data entry points;
    (c) merging said authenticated data with said matched routines to create a quick quote, said quick quote further comprising a set of data fields;
    (d) transmitting said quick quote from said host data processing center to said remote node;
    (e) accepting or rejecting said quote by said applicant, wherein
        (i) if said quote is rejected, then determining whether or not to modify said data to be authenticated; and, if said data is not modified than terminating said routine; or
        (ii) if said quote is accepted, then binding said applicant conditionally and identifying one or more tasks to be performed in respect of said binding;
    (f) performing said one or more tasks; and, if said tasks are successful, then issuing a policy to said applicant in respect of said quote; and
    (g) processing a set of one or more endorsements in respect of said policy,
    wherein a computer processor performs in parallel instructions of the steps of:
    (a) accepting an application for entry into said data processing system;

(b) initiating a policy information routine for matching said insurance application data to a set of one or more data fields of said data processing system said data fields relevant to said application;

(c) establishing a living folder, said living folder comprising a plurality of sub-folders for storing data relevant to said applicant's application;

(d) populating, on a real-time basis, each of said sub-folders with data collected from said data processing system as such data is generated by said plurality of routines; and (e) allowing said data processing system to query each of said sub-folders and to withdraw data from said each of said sub-folders based upon a set of pre-established criteria and needs.

11. The method of claim 10, wherein said pre-established routines further comprise the steps of:

(a) determining a set of one or more options that are available to said applicant for construction of said policy; and (b) determining a set of administrative options available to said applicant in respect of said data input.

12. The method of claim 10, wherein said pre-established routines further comprise the step of determining said set of one more tasks to be performed before said policy can be issued.

13. The method of claim 10, wherein said data input is utilized by said host data processing center to re-calculate and re-set one or more data fields resident within said memory of said system.

14. The method of claim 10, wherein said price points are updated periodically.

15. The method of claim 10, wherein said one or more tasks further comprises inspecting a facility to be covered by said policy.

16. The method of claim 10, wherein said one or more tasks comprises examining an individual to be covered by said policy.

17. A data processing system for data submission management of insurance application data, said system comprising:

(a) a host data processing center comprising a plurality of computers connected via electronic networks;

(b) a set of one or more remote nodes for linking with said host data processing center;

(c) transmission means for transmitting data between said set of one or more remote nodes and said host data processing center;

(d) an input routine residing in said data processing system wherein said routine accepts data input from at least one of said set of one or more remote nodes relative to an insurance application;

(e) authentication means for authenticating said data input;

(f) first matching means for matching said authenticated data with a set of one more pre-established routines residing in a memory of said host data processing center and corresponding to particular data entry points;

(g) merging means for merging said authenticated data with said matched routines to create a submission, said submission further comprising a set of data fields;

(h) second matching means for matching said set of data fields with a set of price points in a quotation routine of said host data processing center to establish a quote in respect of said match;

(i) selection means for accepting or rejecting said quote by said applicant, wherein (1) if said quote is rejected, then determining whether or not to modify said data to be authenticated; and, if said data is not modified than terminating said routine; or (2) if said quote is accepted, then binding said applicant conditionally and identifying one or more tasks to be performed in respect of said binding; and (j) policy issuing means for issuing a policy to said applicant in respect of said quote, wherein a computer processor performs in parallel instructions of the steps of:

(a) accepting an application for entry into said data processing system;

(b) initiating a policy information routine for matching said insurance application data to a set of one or more data fields of said data processing system said data fields relevant to said application;

(c) establishing a living folder, said living folder comprising a plurality of sub-folders for storing data relevant to said applicant's application;

(d) populating, on a real-time basis, each of said sub-folders with data collected from said data processing system as such data is generated by said plurality of routines; and (e) allowing said data processing system to query each of said sub-folders and to withdraw data from said each of said sub-folders based upon a set of pre-established criteria and needs.

18. The system of claim 17, wherein at least one remote node of said set of remote nodes is co-located with said host data processing center.

19. The system of claim 17, wherein said input routine is resident at said host data processing center.

20. The system of claim 17, wherein said input routine is resident at said at least one remote node.

21. The system of claim 17, wherein said transmission means comprises at least wireless transmission means.

22. The system of claim 17, wherein said transmission means comprises at least hard-wired transmission means.

23. The system of claim 17, wherein said one or more tasks further comprises inspecting a facility to be covered by said policy.

24. The system of claim 17, wherein said one or more tasks comprises examining an individual to be covered by said policy.

25. The system of claim 17, wherein said system further comprises a forms library for providing a pre-determined format for data to be transmitted in the form of said quote or of said policy.

26. A data processing system for data submission management of insurance application data, said system comprising:

(a) a host data processing center comprising a plurality of computers connected via electronic networks;

(b) a set of one or more remote nodes for linking with said host data processing center;

(c) transmission means for transmitting data between said set of one or more remote nodes and said host data processing center;

(d) an insurance policy creation application residing in said data processing system, said application further comprising:

(i) a data input routine for allowing a system user to input data relative to an insurance applicant;

(ii) an authentication routine for authenticating said data input;

(iii) a first matching routine for matching said authenticated data with a set of one more pre-established routines residing in a memory of said host data processing center and corresponding to particular data entry points;

(iv) a merging routine for merging said authenticated data with said matched routines to create a submission, said submission further comprising a set of data fields;

(v) a second matching routine for matching said set of data fields with a set of price points in a quotation routine of said host data processing center to establish a quote in respect of said match;

(vi) a selection means for accepting or rejecting said quote by said applicant; and (vii) a policy issuing routine for issuing a policy to said applicant in respect of said quote, wherein a computer processor performs in parallel instructions of the steps of:

(a) accepting an application for entry into said data processing system;

(b) initiating a policy information routine for matching said insurance application data to a set of one or more data fields of said data processing system said data fields relevant to said application;

(c) establishing a living folder, said living folder comprising a plurality of sub-folders for storing data relevant to said applicant's application;

(d) populating, on a real-time basis, each of said sub-folders with data collected from said data processing system as such data is generated by said plurality of routines; and (e) allowing said data processing system to query each of said sub-folders and to withdraw data from said each of said sub-folders based upon a set of pre-established criteria and needs.

27. The system of claim 26, wherein said system further comprises a forms library for providing a pre-determined format for data to be transmitted in the form of said quote or of said policy.

28. The system of claim 26, wherein said system further comprises a rating engine for calculating said set of price points for said quotation routine of said host data processing center.

29. The system of claim 26, wherein said system further comprises printing means for printing a set of reports and/or documents derived from said system.

30. A method for data submission management of insurance application data by a data processing system, said data processing system further comprising an application for controlling a plurality of routines for managing said data submission and creating a policy, said method further comprising the steps of:

a plurality of computer instructions performed via a computer processor and memory chips of:

(a) accepting an application for entry into said data processing system;

(b) initiating a policy information routine for matching said insurance application data to a set of one or more data fields of said data processing system said data fields relevant to said application;

(c) establishing a living folder, said living folder comprising a plurality of sub-folders for storing data relevant to said applicant's application;

(d) populating, on a real-time basis, each of said sub-folders with data collected from said data processing system as such data is generated by said plurality of routines; and (e) allowing said data processing system to query each of said sub-folders and to withdraw data from said each of said sub-folders based upon a set of pre-established criteria and needs.

31. The method of claim 30, said data processing system further comprising a data management routine for directing data to each of said sub-folders in accordance with a pre-established set of criteria associated with each of said sub-folders.

32. The method of claim 31, wherein said living folder further comprises:

(a) a first sub-folder for storing general information about one or more policies associated with said applicant;

(b) a second sub-folder for storing insurance broker information;

(c) a third sub-folder for storing details of said one or more policies;

(d) a fourth sub-folder for storing endorsements associated with said one or more policies;

(e) a fifth sub-folder for storing one or more documents associated with said one or more policies;

(f) a sixth sub-folder for storing communications in respect of said one or more policies;

(g) a seventh sub-folder for storing notes relative to said one or more policies; and (h) an eighth folder for storing task requests relative to said one or more policies.

33. The method of claim 30, wherein said data processing system further comprises a routine for creating notes for entry into a sub-folder of said living folder, said routine further comprising:

(a) a set of rules for automatically creating notes based on available content;

(b) a set of rules for automatically creating notes at specific pre-established date/time points; and (c) a set of rules for creating notes based upon certain events.

34. The method of claim 33, wherein each of said sub-folders may be further sub-divided in accordance with the needs of said respective sub-folder.

35. The method of claim 32, wherein said first sub-folder further comprises:

(a) first data identifying a system user;

(b) second data identifying a broker/underwriter; and (c) third data identifying the status of said policy.

36. The method of claim 32, wherein said second sub-folder further comprises:

(a) a broker name and identifying data;

(b) a broker address; and (c) a set of one or more contact points relative to said broker.

37. The method of claim 32, wherein said third sub-folder further comprises:

(a) a set of policy coverages;

(b) a set of policy limits;

(c) a set of policy costs;

(d) a set of bottom line costs associated with said policy; and (e) a set of locations covered by said policy.

38. The method of claim 32, wherein said third sub-folder further comprises a set of insured classes or additional coverages associated with said one or more policies.

39. The method of claim 32, wherein said fourth sub-folder further comprises data identifying endorsements pertaining to said policy.

40. The method of claim 32, wherein said fifth sub-folder further comprises documents generated in the course of managing said policy.

41. The method of claim 32, wherein said sixth sub-folder further comprises:

(a) a set of electronic copies of communications relative to said policy; and (b) data descriptive of each communication of said set of electronic communications.

42. The method of claim 32, wherein said seventh sub-folder further comprises a set of notes pertaining to one or more events associated with said policy.

43. The method of claim 32, wherein said eighth sub-folder further comprises a description of each of a set of tasks to be performed relative to said policy.

44. The method of claim 30, further comprising the steps of:

(a) initiating a sweeping routine having pre-set parameters for querying a set of one or more remote nodes, said remote nodes comprising data;

(b) identifying data relevant to said pre-set parameters at each one of said queried nodes; and (c) transmitting a copy of said relevant data to said system for use by said application in populating said living folder.

\* \* \* \* \*